US008423715B2

(12) United States Patent
Heil et al.

(10) Patent No.: US 8,423,715 B2
(45) Date of Patent: Apr. 16, 2013

(54) MEMORY MANAGEMENT AMONG LEVELS OF CACHE IN A MEMORY HIERARCHY

(75) Inventors: Timothy H. Heil, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/113,286

(22) Filed: May 1, 2008

(65) Prior Publication Data

US 2009/0276572 A1  Nov. 5, 2009

(51) Int. Cl.
G06F 12/08 (2006.01)

(52) U.S. Cl.
USPC ........... 711/118; 711/136; 711/119; 711/162; 711/143; 711/E12.016

(58) Field of Classification Search .................. 711/118, 711/136, 119, E12.016
See application file for complete search history.

(56) References Cited

U.S. PATENT DOCUMENTS

| | | | |
|---|---|---|---|
| 4,813,037 A | 3/1989 | Debuysscher et al. |
| 4,951,195 A | 8/1990 | Fogg et al. |
| 5,167,023 A | 11/1992 | De Nicolas et al. |
| 5,301,302 A | 4/1994 | Blackard et al. |
| 5,442,797 A | 8/1995 | Casavant et al. |
| 5,590,308 A * | 12/1996 | Shih ............................. 711/136 |
| 5,761,516 A | 6/1998 | Rostoker et al. |
| 5,784,706 A | 7/1998 | Oberlin et al. |
| 5,870,479 A | 2/1999 | Feiken et al. |
| 5,872,963 A | 2/1999 | Bitar et al. |
| 5,884,060 A | 3/1999 | Vegesna et al. |
| 5,887,166 A | 3/1999 | Mallick et al. |
| 5,974,498 A | 10/1999 | Hopkins |
| 6,021,470 A | 2/2000 | Frank et al. |
| 6,044,478 A | 3/2000 | Green |
| 6,047,122 A | 4/2000 | Spiller |
| 6,049,866 A | 4/2000 | Earl |
| 6,085,296 A | 7/2000 | Karkhanis et al. |
| 6,085,315 A | 7/2000 | Fleck et al. |
| 6,101,599 A | 8/2000 | Wright et al. |
| 6,105,119 A | 8/2000 | Kerr et al. |
| 6,119,215 A | 9/2000 | Key et al. |

(Continued)

FOREIGN PATENT DOCUMENTS

| | | |
|---|---|---|
| CN | 1599471 | 3/2005 |
| CN | 1599471 A | 3/2005 |

OTHER PUBLICATIONS

David Taylor, et al. "System on Chip Packet Processor for an Experimental Network Service Platform". 2003.
Office Action Dated Mar. 30, 2010 in U.S. Appl. No. 11/926,212.

(Continued)

*Primary Examiner* — Mardochee Chery
(74) *Attorney, Agent, or Firm* — Biggers & Ohanian, LLP

(57) ABSTRACT

A memory hierarchy in a computer includes levels of cache. The computer also includes a processor operatively coupled through two or more levels of cache to a main random access memory. Caches closer to the processor in the hierarchy are characterized as higher in the hierarchy. Memory management among the levels of cache includes identifying a line in a first cache that is preferably retained in the first cache, where the first cache is backed up by at least one cache lower in the memory hierarchy and the lower cache implements an LRU-type cache line replacement policy. Memory management also includes updating LRU information for the lower cache to indicate that the line has been recently accessed.

15 Claims, 5 Drawing Sheets

U.S. PATENT DOCUMENTS

| | | | |
|---|---|---|---|
| 6,145,072 A | 11/2000 | Shams et al. | |
| 6,151,668 A | 11/2000 | Pechanek et al. | |
| 6,164,841 A | 12/2000 | Mattson et al. | |
| 6,272,598 B1 | 8/2001 | Arlitt et al. | |
| 6,292,888 B1 | 9/2001 | Nemirovsky et al. | |
| 6,370,622 B1 | 4/2002 | Chiou et al. | |
| 6,385,695 B1* | 5/2002 | Arimilli et al. | 711/122 |
| 6,434,669 B1 | 8/2002 | Arimilli et al. | |
| 6,446,171 B1* | 9/2002 | Henriksen | 711/136 |
| 6,493,817 B1 | 12/2002 | Renstrom | |
| 6,519,605 B1 | 2/2003 | Gilgen et al. | |
| 6,561,895 B2 | 5/2003 | McGill | |
| 6,567,895 B2 | 5/2003 | Scales | |
| 6,591,347 B2 | 7/2003 | Tischler et al. | |
| 6,625,662 B1 | 9/2003 | Satoh et al. | |
| 6,668,307 B1* | 12/2003 | Damron | 711/137 |
| 6,668,308 B2 | 12/2003 | Barroso et al. | |
| 6,675,284 B1 | 1/2004 | Warren | |
| 6,697,932 B1 | 2/2004 | Yoaz et al. | |
| 6,725,317 B1 | 4/2004 | Bouchier et al. | |
| 6,823,429 B1 | 11/2004 | Olnowich | |
| 6,832,184 B1 | 12/2004 | Bleier et al. | |
| 6,877,086 B1 | 4/2005 | Boggs et al. | |
| 6,891,828 B2 | 5/2005 | Ngai | |
| 6,898,791 B1 | 5/2005 | Chandy et al. | |
| 6,915,402 B2 | 7/2005 | Wilson et al. | |
| 6,938,253 B2 | 8/2005 | Kim | |
| 6,950,438 B1 | 9/2005 | Owen et al. | |
| 6,973,032 B1 | 12/2005 | Casley et al. | |
| 6,988,149 B2 | 1/2006 | Odenwald | |
| 7,010,580 B1 | 3/2006 | Fu et al. | |
| 7,015,909 B1 | 3/2006 | Morgan, III et al. | |
| 7,072,996 B2 | 7/2006 | Adusumilli et al. | |
| 7,162,560 B2 | 1/2007 | Taylor et al. | |
| 7,376,789 B2 | 5/2008 | Halleck et al. | |
| 7,394,288 B1 | 7/2008 | Agarwal | |
| 7,398,374 B2 | 7/2008 | DeLano | |
| 7,464,197 B2 | 12/2008 | Ganapathy et al. | |
| 7,478,225 B1 | 1/2009 | Brooks et al. | |
| 7,493,474 B1 | 2/2009 | Pechanek et al. | |
| 7,500,060 B1 | 3/2009 | Anderson et al. | |
| 7,502,378 B2 | 3/2009 | Lajolo et al. | |
| 7,521,961 B1 | 4/2009 | Anderson et al. | |
| 7,533,154 B1 | 5/2009 | Chen et al. | |
| 7,539,124 B2 | 5/2009 | Rhim et al. | |
| 7,546,444 B1 | 6/2009 | Wolrich et al. | |
| 7,568,064 B2 | 7/2009 | Reblewski et al. | |
| 7,590,774 B2 | 9/2009 | Johns et al. | |
| 7,613,882 B1 | 11/2009 | Akkawi et al. | |
| 7,664,108 B2 | 2/2010 | Bahattab | |
| 7,689,738 B1 | 3/2010 | Williams et al. | |
| 7,701,252 B1 | 4/2010 | Chow et al. | |
| 7,861,065 B2 | 12/2010 | Heil et al. | |
| 7,882,307 B1 | 2/2011 | Wentslaff et al. | |
| 7,886,084 B2 | 2/2011 | Chen et al. | |
| 7,913,010 B2 | 3/2011 | Hoover et al. | |
| 7,917,703 B2 | 3/2011 | Comparan et al. | |
| 7,958,340 B2 | 6/2011 | Hoover et al. | |
| 7,991,978 B2 | 8/2011 | Kuesel et al. | |
| 8,010,750 B2 | 8/2011 | Comparan et al. | |
| 8,018,466 B2 | 9/2011 | Hoover et al. | |
| 8,020,168 B2 | 9/2011 | Hoover et al. | |
| 8,040,799 B2 | 10/2011 | Hoover et al. | |
| 2002/0099833 A1 | 7/2002 | Steely et al. | |
| 2002/0178337 A1 | 11/2002 | Wilson et al. | |
| 2003/0065890 A1 | 4/2003 | Lyon | |
| 2004/0037313 A1 | 2/2004 | Gulati et al. | |
| 2004/0083341 A1 | 4/2004 | Robinson et al. | |
| 2004/0088487 A1 | 5/2004 | Barroso et al. | |
| 2004/0151197 A1 | 8/2004 | Hui | |
| 2004/0153579 A1 | 8/2004 | Shih et al. | |
| 2004/0216105 A1 | 10/2004 | Burky et al. | |
| 2004/0250046 A1 | 12/2004 | Gonzalez et al. | |
| 2004/0260906 A1 | 12/2004 | Landin et al. | |
| 2005/0044319 A1 | 2/2005 | Olukotun | |
| 2005/0086435 A1* | 4/2005 | Todoroki | 711/128 |
| 2005/0097184 A1 | 5/2005 | Brown et al. | |
| 2005/0149689 A1 | 7/2005 | Sodani et al. | |
| 2005/0160209 A1 | 7/2005 | Van Doren et al. | |
| 2005/0166205 A1 | 7/2005 | Oskin et al. | |
| 2005/0198442 A1 | 9/2005 | Mandler | |
| 2005/0203988 A1* | 9/2005 | Nollet et al. | 709/201 |
| 2005/0228952 A1 | 10/2005 | Mayhew et al. | |
| 2005/0238035 A1 | 10/2005 | Riley | |
| 2006/0095920 A1 | 5/2006 | Goossens | |
| 2006/0101249 A1 | 5/2006 | Bacon et al. | |
| 2006/0203825 A1 | 9/2006 | Beigne et al. | |
| 2006/0209846 A1 | 9/2006 | Clermidy et al. | |
| 2006/0242393 A1 | 10/2006 | Park et al. | |
| 2007/0055826 A1 | 3/2007 | Morton et al. | |
| 2007/0055961 A1 | 3/2007 | Callister et al. | |
| 2007/0074191 A1 | 3/2007 | Geisinger | |
| 2007/0076739 A1 | 4/2007 | Manjeshwar et al. | |
| 2007/0180310 A1 | 8/2007 | Johnson et al. | |
| 2007/0226407 A1 | 9/2007 | Radulescu et al. | |
| 2007/0271557 A1 | 11/2007 | Geisinger | |
| 2007/0283324 A1 | 12/2007 | Geisinger | |
| 2008/0028401 A1 | 1/2008 | Geisinger | |
| 2008/0133885 A1 | 6/2008 | Glew | |
| 2008/0134191 A1 | 6/2008 | Warrier et al. | |
| 2008/0181115 A1 | 7/2008 | Soulie et al. | |
| 2008/0186998 A1 | 8/2008 | Rijpkema | |
| 2008/0205432 A1 | 8/2008 | Gangwal | |
| 2008/0216073 A1 | 9/2008 | Yates et al. | |
| 2008/0307422 A1 | 12/2008 | Kurland et al. | |
| 2008/0320235 A1 | 12/2008 | Beckman et al. | |
| 2009/0019190 A1 | 1/2009 | Blocksome | |
| 2009/0083263 A1 | 3/2009 | Felch et al. | |
| 2009/0122703 A1 | 5/2009 | Gangwal et al. | |
| 2009/0125574 A1 | 5/2009 | Mejdrich et al. | |
| 2009/0125703 A1 | 5/2009 | Mejdrich et al. | |
| 2009/0125706 A1 | 5/2009 | Hoover et al. | |
| 2009/0135739 A1 | 5/2009 | Hoover et al. | |
| 2009/0213863 A1 | 8/2009 | Denteneer et al. | |
| 2009/0231349 A1 | 9/2009 | Mejdrich et al. | |
| 2009/0260013 A1 | 10/2009 | Heil et al. | |
| 2009/0282222 A1 | 11/2009 | Hoover et al. | |

OTHER PUBLICATIONS

Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Virtanen, et al. "NoC Interface for a Protocol Processor". University of Turku.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
Office Action Dated Jan. 29, 2010 in U.S. Appl. No. 11/945,396.
Final Office Action Dated Jan. 15, 2010 in U.S. Appl. No. 12/031,733.
Office Action Dated Jul. 20, 2009 in U.S. Appl. No. 12/031,733.
Kuskin, et al.; The Stanford Flash Multiprocessor; Jun. 6, 1996; Stanford University.
Steve Furber, Future Trends in SOC Interconnect, Aug. 2000.
Bolotin, et al., The Power of Priority:NoC based Distributed Cache Coherency, May 21, 2007, IEEE, pp. 117-126.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.

Cifuentes et al. "Walkabout—A Retargetable Dynamic Binary Translation Framework", Sun Microsystems Laboratories, Jan. 2002, 13 pages.
Issenin et al.; (Date Reuse Driven Memory and network-on-Chip Co-Synthesis); NSF; pp. 1-7.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Al-Hashimi; ("System-on-Chip- Net Generation Electronics", "Asynchronous on-chip networks"2006); Chapter 18 p. 1-32.
Final Office Action, U.S. Appl. No. 11/926,212, Aug. 23, 2010.
Final Office Action, U.S. Appl. No. 11/955,553, Sep. 13, 2010.
Final Office Action, U.S. Appl. No. 12/031,733, Aug. 19, 2010.
Notice of Allowance, U.S. Appl. No. 12/118,298, Aug. 18, 2010.
Office Action, U.S. Appl. No. 11/972,753, Oct. 4, 2010.
Office Action, U.S. Appl. No. 12/015,975, Jul. 22, 2010.
Office Action, U.S. Appl. No. 11/937,579, Sep. 16, 2010.
Office Action, U.S. Appl. No. 12/118,059, Sep. 1, 2010.
Office Action, U.S. Appl. No. 12/121,168, Oct. 5, 2010.
Nikolay Kvaldjiev et al., A Virtual Channel Network-on-chip for GT and BE traffic, Apr. 2006, IEEE Emerging VLSI Technologies and Architectures.
Office Action, U.S. Appl. No. 11/926,212, Dec. 7, 2010.
Office Action, U.S. Appl. No. 11/945,396, Dec. 9, 2010.
Notice of Allowance, U.S. Appl. No. 11/955,553, Nov. 22, 2010.
Notice of Allowance, U.S. Appl. No. 12/031,733, Nov. 16, 2010.
Office Action, U.S. Appl. No. 12/118,017, Dec. 8, 2010.
Office Action, U.S. Appl. No. 12/118,272, Dec. 2, 2010.
Office Action, U.S. Appl. No. 12/108,846, Dec. 2, 2010.
Final Office Action, U.S. Appl. No. 12/117,875, Nov. 10, 2010.
Office Action, U.S. Appl. No. 12/117,906, May 9, 2008.
Office Action, U.S. Appl. No. 12/060,559, Nov. 3, 2010.
Advisory Action, U.S. Appl. No. 11/926,212, Nov. 2, 2010.
Kumar et al.; "A Network on Chip Architecture and Design Methodology";2002; IEEE.
Final Office Action, U.S. Appl. No. 11/945,396, Sep. 1, 2011.
Final Office Action, U.S. Appl. No. 11/972,753, Sep. 7, 2011.
Office Action, U.S. Appl. No. 12/135,364, Aug. 5, 2011.
Office Action, U.S. Appl. No. 12/102,033, Oct. 7, 2011.
Office Action, U.S. Appl. No. 11/937,579, Aug. 15, 2011.
Office Action, U.S. Appl. No. 12/233,180, Oct. 6, 2011.
Office Action, U.S. Appl. No. 12/121,222, Sep. 20, 2011.
Final Office Action, U.S. Appl. No. 12/108,770, Sep. 30, 2011.
Final Office Action, U.S. Appl. No. 11/926,212, May 17, 2011.
Nollet, V., et al., "Centralized Run-Time Resource Management in a Network-on-Chip Containing Reconfigurable Hardware Tiles" [online]. 2005 [retrieved Jul. 15, 2011], Retrieved from Internet: http://portal.acm.org/ft_gateway.cfm?id=1049106&type=pdf &CFID=32720390&CFTOKEN=986277114, pp. 1-6.
Office Action, U.S. Appl. No. 11/936,873, Jul. 21, 2011.
Office Action, U.S. Appl. No. 12/031,738, Jul. 11, 2011.
Final Office Action, U.S. Appl. No. 12/060,559, Jul. 8, 2011.
Advisory Action, U.S. Appl. No. 11/945,396, Mar. 21, 2012.
RCE, U.S. Appl. No. 11/936,873, Mar. 16, 2012.
Advisory Action, U.S. Appl. No. 12/118,315, Mar. 27, 2012.
Office Action, U.S. Appl. No. 11/972,753, Jan. 19, 2012.
Final Office Action, U.S. Appl. No. 12/135,364, Jan. 26, 2012.
Final Office Action, U.S. Appl. No. 11/937,579, Jan. 19, 2012.
Notice of Allowance, U.S. Appl. No. 12/233,180, Feb. 3, 2012.
Notice of Allowance, U.S. Appl. No. 12/121,222, Feb. 3, 2012.
Notice of Allowance, U.S. Appl. No. 12/118,039, Feb. 23, 2012.
Office Action, U.S. Appl. No. 12/113,286, Feb. 17, 2012.
Master Dissertation, University of Electronic Science and Technology of China, pp. 0-35 and pp. 36-81 (includes English abstract).
1994-2010 China Academic Journal Electronic Publishing House, pp. 0-30 and pp. 31-66 (includes English abstract).
Final Office Action, U.S. Appl. No. 11/972,753, Feb. 18, 2011.
Final Office Action, U.S. Appl. No. 12/015,975, Jan. 7, 2011.
Final Office Action, U.S. Appl. No. 12/108,846, Feb. 17, 2011.
Final Office Action, U.S. Appl. No. 12/113,286, Feb. 18, 2011.
Final Office Action, U.S. Appl. No. 12/118,059, Feb. 17, 2011.
Office Action, U.S. Appl. No. 11/945,396, Mar. 3, 2011.
Final Office Action, U.S. Appl. No. 12/118,017, Mar. 28, 2011.
Final Office Action, U.S. Appl. No. 11/937,579, Feb. 23, 2011.
Office Action, U.S. Appl. No. 12/108,770, Apr. 12, 2011.
Final Office Action, U.S. Appl. No. 12/117,906, Mar. 28, 2011.
Office Action, U.S. Appl. No. 12/060,559, Apr. 1, 2011.
Nollet, et al., "Centralized Run-Time Resource Management in a Network-on-Chip Containing Reconfigurable Hardware Tiles" [online]. 2005 [retrieved Jul. 15, 2011], Retrieved from Internet: http://portal.acm.org/ft_gateway.cfm?id=1049106&type=pdf &CFID=32720390&CFTOKEN=986277114, pp. 1-6.
Master Dissertation, University of Electronic Science and Technology of China, 2007, pp. 0-35 and pp. 36-81 (includes English abstract).
China Academic Journal Electronic Publishing House, 1994-2010, pp. 0-30 and pp. 31-66 (includes English abstract).
Wikipedia, "Parallel Computing", Wikipedia [online], URL: http://en.wikipedia.org/wiki/Parallel_computing, Jan. 19, 2007, pp. 1-6, USA.
Pande et al., "Performance Evaluation and Design Trade-Offs for Network-on-Chip Interconnect Architectures", IEEE Transactions on Computers, vol. 54, No. 8, Aug. 2005, pp. 1025-1040, IEEE Computer Society, USA.
Radulescu et al., "An Efficient On-Chip Network Interface Offering Guaranteed Services, Shared-Memory Abstraction, and Flexible Network Configuration", from Proceedings of the Design, Automation and Test in Europe Conference and Exhibition (DATE'04), held in Paris, France Feb. 2004, pp. 878-883, vol. 2, IEEE Computer Society, USA.
Samman et al., "Networks-On-Chip Based on Dynamic Wormhole Packet Identity Mapping Management", VLSI Design, Aug. 7, 2008, 15 pp., vol. 2009, Article ID 941701, Hindawi Publishing Corporation, USA.
Final Office Action, U.S. Appl. No. 11/936,873, Dec. 30, 2011.
Notice of Allowance, U.S. Appl. No. 12/029,647, Feb. 25, 2011.
Office Action, U.S. Appl. No. 12/118,315, Jul. 26, 2011.
Final Office Action, U.S. Appl. No. 12/031,738, Dec. 22, 2011.
Notice of Allowance, U.S. Appl. No. 12/015,975, Apr. 15, 2011.
Notice of Allowance, U.S. Appl. No. 12/118,272, Mar. 22, 2011.
Office Action, U.S. Appl. No. 11/938,376, Oct. 18, 2011.
Notice of Allowance, U.S. Appl. No. 12/108,846, May 13, 2011.
Notice of Allowance, U.S. Appl. No. 12/117,875, Jan. 27, 2011.
Notice of Allowance, U.S. Appl. No. 12/117,897, May 4, 2011.
Office Action, U.S. Appl. No. 12/113,286, Oct. 14, 2010.
Notice of Allowance, U.S. Appl. No. 12/121,168, Mar. 22, 2011.
Notice of Allowance, U.S. Appl. No. 12/121,168, Sep. 9, 2011.
Hansson et al. "Avoiding Message-Dependent Deadlock in Network-Based Systems on Chip", Jan. 6-10, 2007, vol. 2007, 10 pages.
Notice of Allowance, U.S. Appl. No. 11/972,753, Sep. 28, 2012.
Office Action, U.S. Appl. No. 12/031,738, Aug. 20, 2012.
Office Action, U.S. Appl. No. 12/118,059, Aug. 14, 2012.
Final Office Action, U.S. Appl. No. 11/945,396, Jul. 19, 2012.
Final Office Action, U.S. Appl. No. 12/972,753, Jul. 22, 2012.
RCE, U.S. Appl. No. 12/102,033, Jun. 21, 2012.
Office Action, U.S. Appl. No. 12/113,286, Jul. 19, 2012.

* cited by examiner

MEMORY MANAGEMENT AMONG LEVELS OF CACHE IN A MEMORY HIERARCHY

BACKGROUND OF THE INVENTION

1. Field of the Invention

The field of the invention is data processing, or, more specifically methods, apparatus, and products for memory management among levels of cache in a memory hierarchy.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems often include a memory hierarchy of caches and main memory. Frequently used information may be stored in the caches for faster access than access from main memory. From time to time, frequently used information, preferably retained in an upper level cache, is evicted from the upper levels of cache due to an eviction of the same information in lower levels of cache causing a longer access time of the information upon a subsequent attempt to access the information.

SUMMARY OF THE INVENTION

Methods, apparatus, and product for memory management among levels of cache in a memory hierarchy in a computer with a processor operatively coupled through two or more levels of cache to a main random access memory, caches closer to the processor in the hierarchy characterized as higher in the hierarchy, including: identifying a line in a first cache that is preferably retained in the first cache, the first cache backed up by at least one cache lower in the memory hierarchy, the lower cache implementing an LRU-type cache line replacement policy; and updating LRU information for the lower cache to indicate that the line has been recently accessed.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
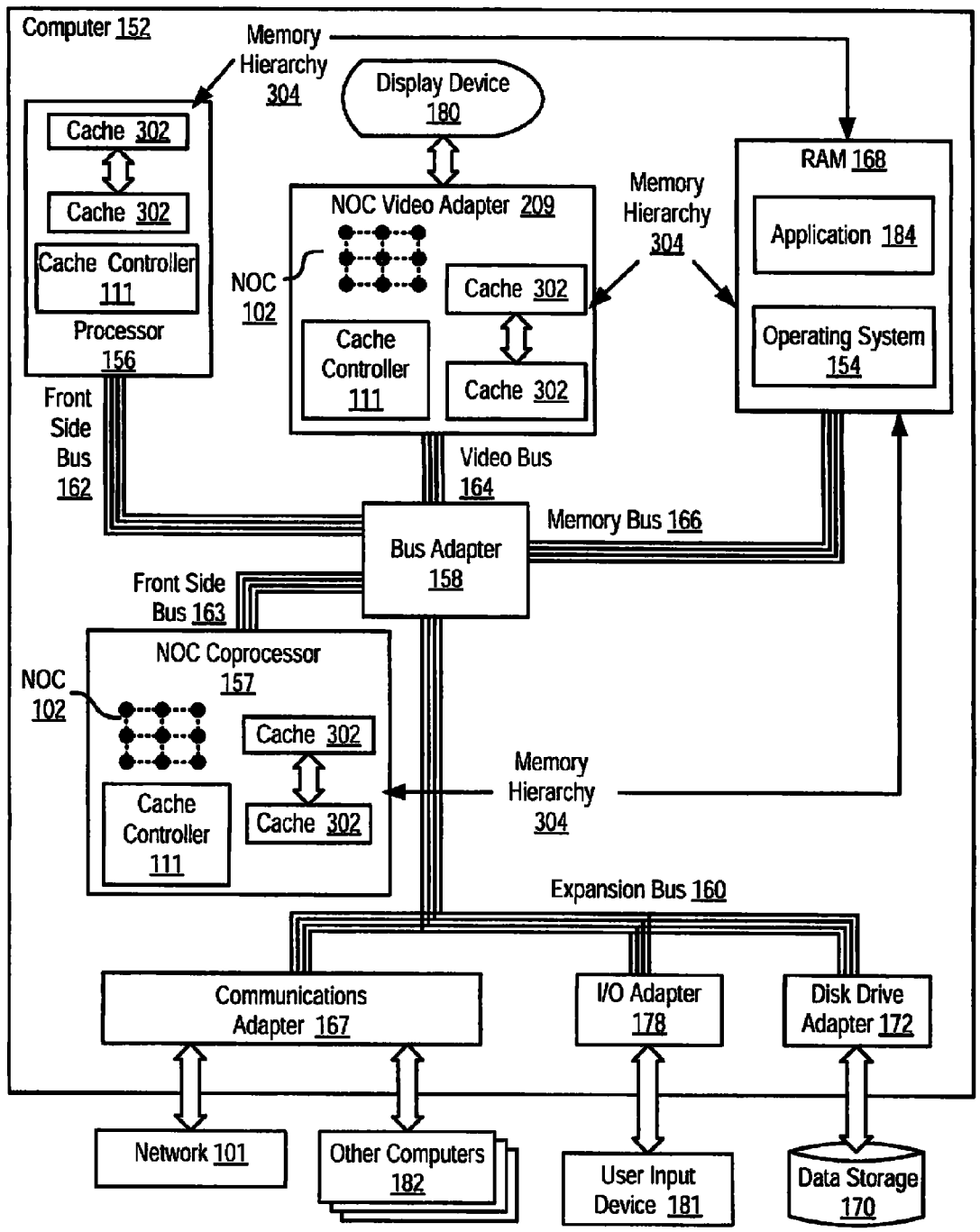
FIG. 1 sets forth a block diagram of automated computing machinery comprising an exemplary computer useful in memory management among levels of cache in a memory hierarchy according to embodiments of the present invention.

Exemplary apparatus and methods for memory management among levels of cache in a memory hierarchy in accordance with the present invention are described with reference to the accompanying drawings, beginning with FIG. 1. FIG. 1 sets forth a block diagram of automated computing machinery comprising an exemplary computer (152) useful in memory management among levels of cache in a memory hierarchy according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The processor (156) in the example computer (152) of FIG. 1 is coupled through two or more levels of cache (302) to RAM (168), where levels of cache (302) closer to processor (156) are characterized as higher in the memory hierarchy (304). The processor (156) includes a cache controller that controls access to each level of cache (302). The cache controller (111) in the processor (156) of FIG. 1 is configured to: identify a line in a first cache that is preferably retained in the first cache, the first cache backed up by at least one cache lower in the memory hierarchy, the lower cache implementing a least recently used type ('LRU-type') cache line replacement policy; and update LRU information for the lower cache to indicate that the line has been recently accessed.

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful for memory management among levels of cache in a memory hierarchy according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC. The NOC of the NOC video adapter (209) and NOC coprocessor (157) includes integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. In the example computer (152) of FIG. 1, the NOC video adapter (209) and the NOC coprocessor (157) may implement memory management among levels of cache (302) in a memory hierarchy (304). The NOC video adapter (209) and the NOC coprocessor (157), like the processor (156), are also coupled through two or more levels of cache (302) to RAM (168), where levels of cache (302) closer to the NOC coprocessor and NOC video adapter are characterized as higher in the memory hierarchy (304).

The NOC video adapter and NOC coprocessor each also include a cache controller (111) that controls access to levels of cache (302). The cache controllers (111) in the example of FIG. 1 are configured to: identify a line in a first cache that is preferably retained in the first cache, the first cache backed up by at least one cache lower in the memory hierarchy, the lower cache implementing an LRU-type cache line replacement policy; and update LRU information for the lower cache to indicate that the line has been recently accessed.

The NOC video adapter and the NOC coprocessor are optimized for programs that use parallel processing and also require fast random access to shared memory. The details of the NOC structure and operation are discussed below with reference to FIGS. 2-4.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for memory management among levels of cache in a memory hierarchy according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for memory management among levels of cache in a memory hierarchy according to embodiments of the present invention include modems for wired dial-up communications, Ethernet (IEEE 802.3) adapters for wired data communications network communications, and 802.11 adapters for wireless data communications network communications.

Figure 2:
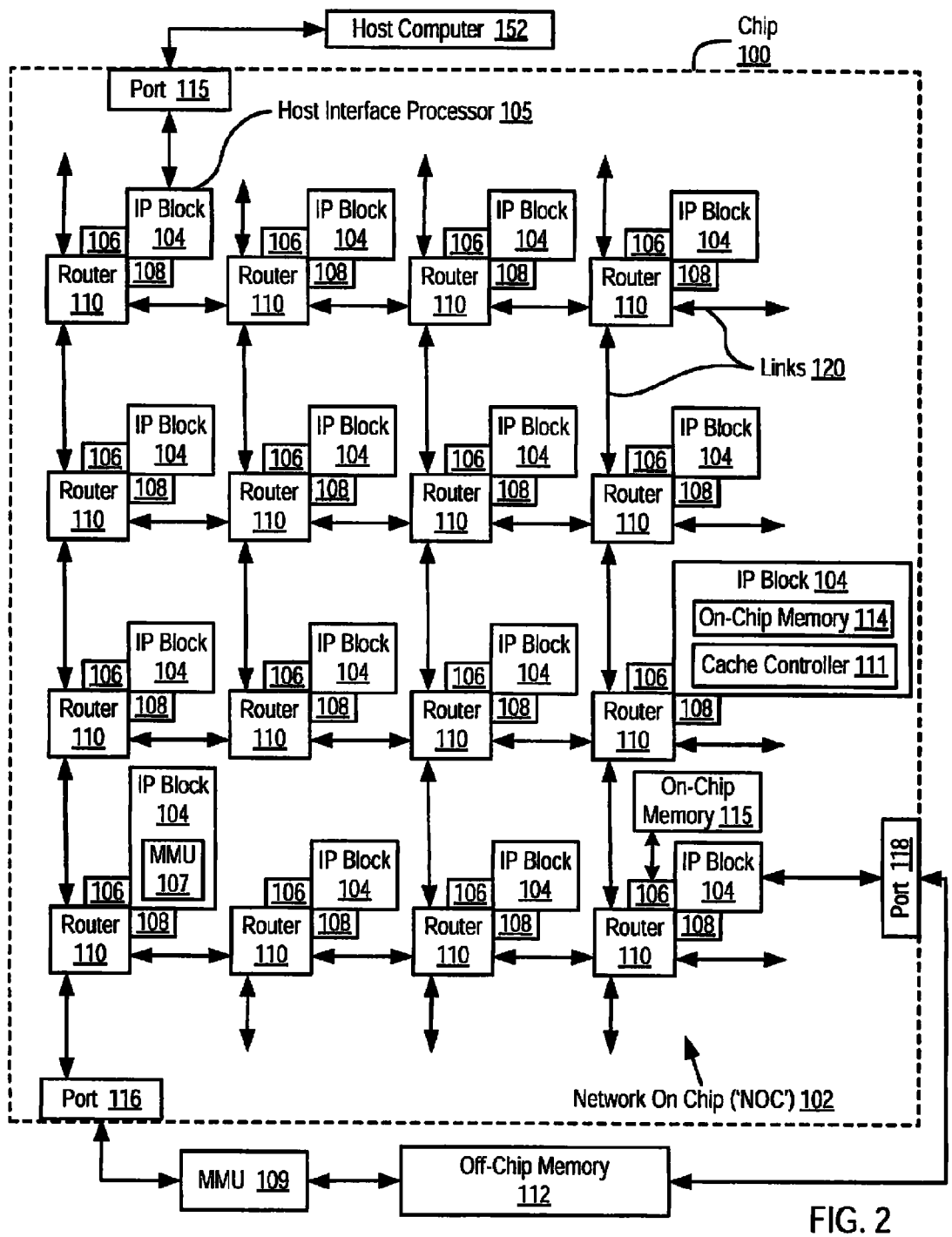
FIG. 2 sets forth a functional block diagram of an example apparatus useful for memory management among levels of cache in a memory hierarchy according to embodiments of the present invention.

For further explanation, FIG. 2 sets forth a functional block diagram of an example apparatus useful for memory management among levels of cache in a memory hierarchy according to embodiments of the present invention, a NOC (102). The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC of FIG. 2 includes a cache controller (111) that controls access to levels of cache, which may be implemented as on-chip caches. The example cache controller (111) in the NOC (102) of FIG. 2 is configured to identify a line in a first cache that is preferably retained in the first cache, the first cache backed up by at least one cache lower in the memory hierarchy, the lower cache implementing an LRU-type cache line replacement policy; and updating LRU information for the lower cache to indicate that the line has been recently accessed.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
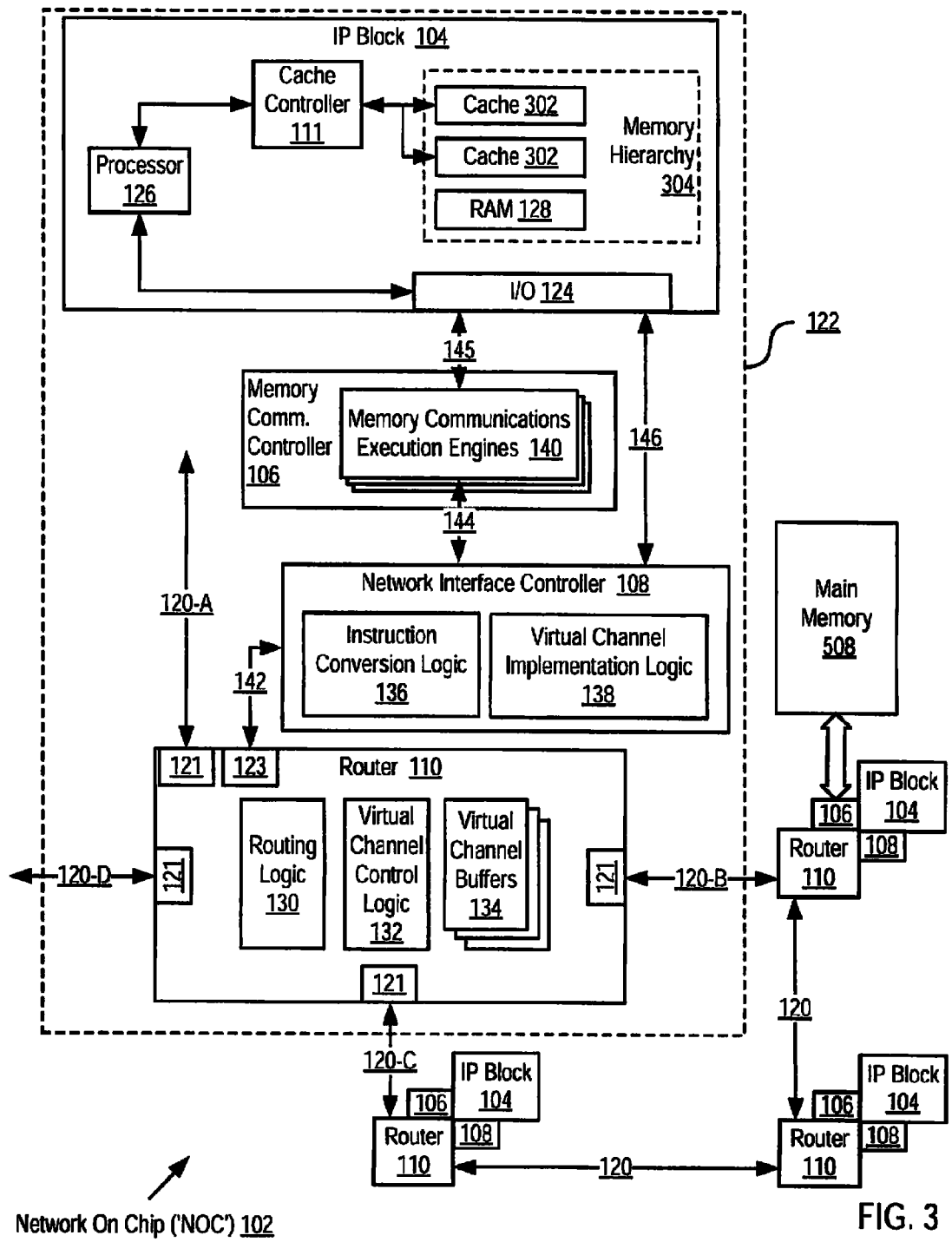
FIG. 3 sets forth a functional block diagram of a further example apparatus useful for memory management among levels of cache in a memory hierarchy according to embodiments of the present invention.

For further explanation, FIG. 3 sets forth a functional block diagram of a further example apparatus useful for memory management among levels of cache in a memory hierarchy according to embodiments of the present invention, a NOC (102). The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

The NOC (102) in the example of FIG. 3 implements memory management among levels of cache (302) in a memory hierarchy (304) in accordance with embodiments of the present invention. The NOC (102) may implement such memory management in a computer with a processor (126) operatively coupled through two or more levels of cache (302) to a main random access memory (128, 508). Caches which are closer to the processor in the hierarchy (305) are characterized as higher in the hierarchy. The IP block (104) of the expanded set (122) may carry out memory management in accordance with embodiments of the present invention by identifying, by the cache controller (111), a line in a first cache that is preferably retained in the first cache, the first cache backed up by at least one cache lower in the memory hierarchy, the lower cache implementing a least recently used type ('LRU-type') cache line replacement policy; and updating by the cache controller (111) LRU information for the lower cache to indicate that the line has been recently accessed.

In the example of FIG. 3, each IP block (104) includes a computer processor (126) and I/O functionality (124). In this example, computer memory is represented by a segment of random access memory ('RAM') (128) in each IP block (104) and main memory (508). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
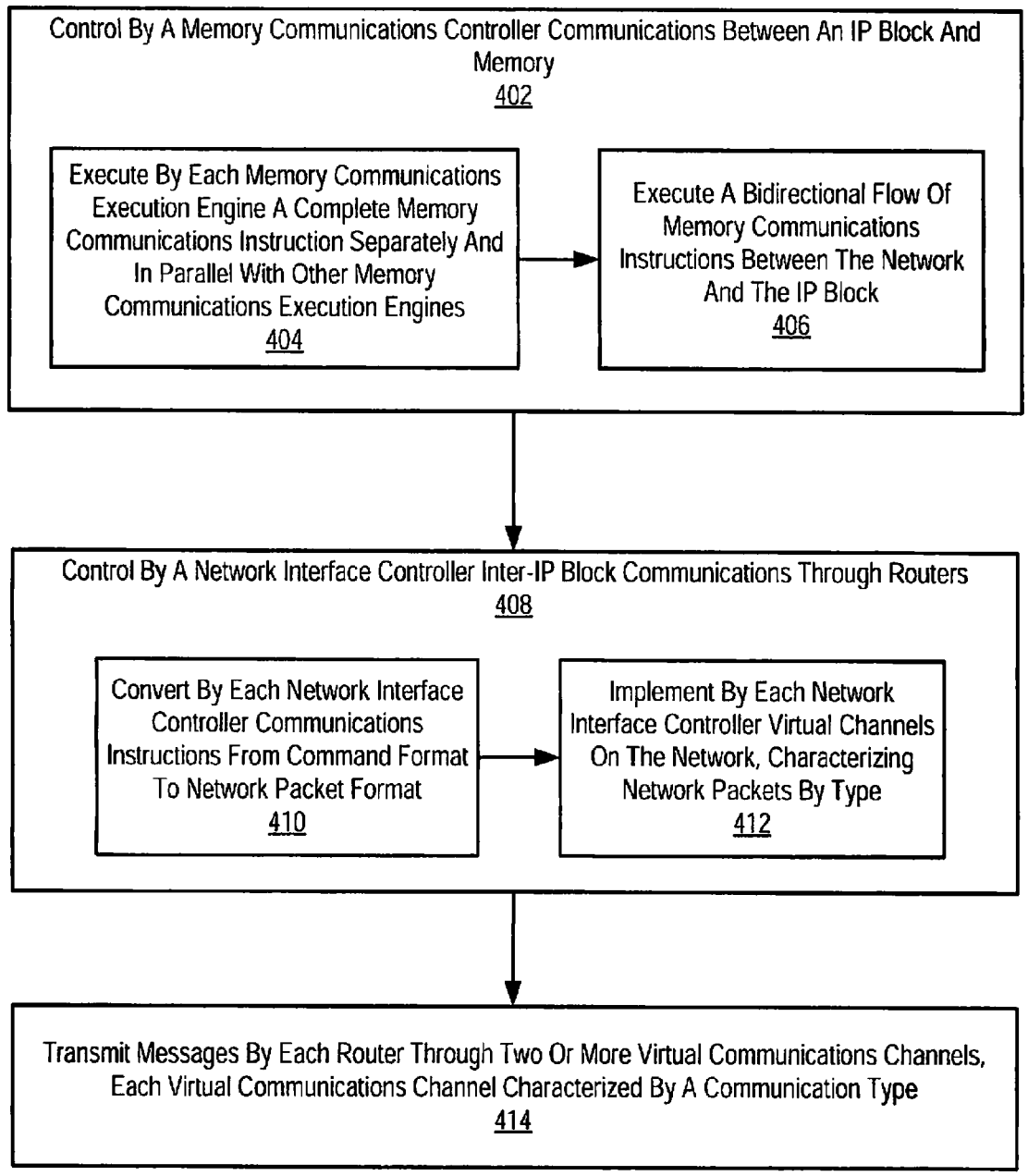
FIG. 4 sets forth a flow chart illustrating an exemplary method for data processing with an apparatus useful for memory management among levels of cache in a memory hierarchy according to embodiments of the present invention.

For further explanation, FIG. 4 sets forth a flow chart illustrating an exemplary method for data processing with an apparatus useful for memory management among levels of cache in a memory hierarchy according to embodiments of the present invention, a NOC. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 5:
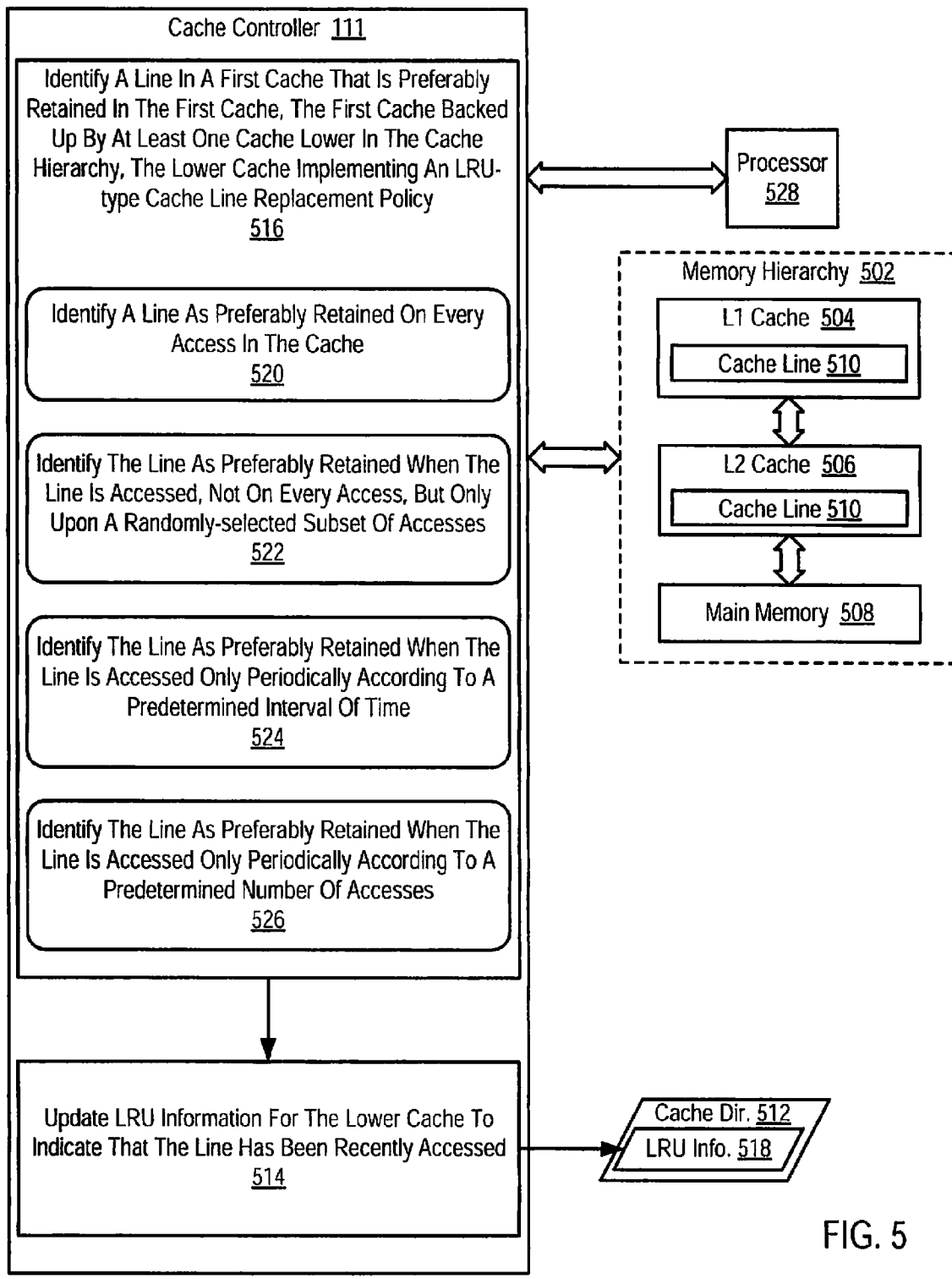
FIG. 5 sets forth a flow chart illustrating an exemplary method for memory management among levels of cache in a memory hierarchy according to embodiments of the present invention.

For further explanation, FIG. 5 sets forth a flow chart illustrating an exemplary method for memory management among levels of cache in a memory hierarchy according to embodiments of the present invention. The method of FIG. 5 may be implemented in a computer (152 on FIG. 1) with a processor (528) operatively coupled through two or more levels of cache (504, 506) to a main random access memory (508) with caches closer to the processor (528) in the hierarchy (502) characterized as higher in the hierarchy (502). In the method of FIG. 5, the 'operative coupling' of the processor to main memory is implemented through a cache controller (111) controlling access to levels of cache (504,506).

A cache is a collection of data duplicating original values stored elsewhere or computed earlier, where the original data is expensive to fetch, due to longer access time, or to compute, compared to the cost of reading or writing to the cache. That is, a cache is a temporary storage area where frequently accessed data can be stored for rapid access. Once the data is stored in the cache, future use can be made by accessing the cached copy rather than re-fetching or recomputing the original data, so that the average access time is shorter. A cache helps expedite data access that a processor would otherwise need to fetch from main memory.

The hierarchical arrangement of storage in computer architectures is called a memory hierarchy. The memory hierarchy is designed to take advantage of memory locality. Each level of the hierarchy has properties of higher speed, smaller size, and lower latency than lower levels. Most modern CPUs are so fast that for most program workloads, the locality of reference of memory accesses and the efficiency of the caching and memory transfer between different levels of the hierarchy are the practical limitation on processing speed. As a result, the CPU spends much of its time idling, waiting for memory I/O to complete. A typical memory hierarchy in a computer system may include:

Processor registers—a hierarchal level of memory having the fastest possible access of all levels, usually 1 CPU cycle, and only hundreds of bytes in size;

Level 1 ('L1') cache—a hierarchal level of memory typically accessed in just a few CPU cycles, typically tens of kilobytes in size;

Level 2 ('L2') cache—a hierarchal level of memory having 2 to 10 times higher latency than L1, typically 512 kilobytes or more in size;

Main memory, such as 'DRAM'—a hierarchal level of memory typically accessed in hundreds of CPU cycles, typical one or more gigabytes in size.

Flash Memory—a hierarchal level having access times faster than disk storage, typically less than 8 gigabytes in size;

Hard disk storage—a hierarchal level of memory in which access times range in the hundreds of thousands of CPU cycles, typically ranging in size from tens of gigabytes to terabytes;

And so on with increasing access times and size as will occur to readers of skill in the art.

In memory hierarchies in which memory is managed in accordance with embodiments of the present invention, caches are typically implemented as write-through caches. That is, when a cache line is written to a cache of a particular level, the same cache line is also written to a cache in a lower level. The same cache line, therefore, typically exists in multiple levels of a cache in a memory hierarchy.

The method of FIG. 5 includes identifying (516) a line (510) in a first cache (504) that is preferably retained in the first cache (504). In the method of FIG. 5, the first cache (504), here an 'L1' cache, is backed up by at least one cache lower in the memory hierarchy, the L2 cache (506). The lower cache (506) in the example of FIG. 5 implements an LRU-type cache line replacement policy. A replacement policy is a module of computer program instructions, an algorithm, for managing information stored in cache. When the cache is full, the replacement policy identifies which item in the cache to evict from the cache in order to make room for new information. A least recently used type ('LRU-type') replacement policy is an algorithm that identifies the first information in a cache to evict as the least recently used information. This algorithm tracks when cache lines are accessed. Some implementations of LRU-type replacement policies track when cache lines are accessed by maintaining 'age bits' for the cache lines in a cache directory (512). In such an implementation, every time a cache line is accessed, the age of all other cache lines are modified. This is just one example implementation of an LRU-type replacement policy, used here for clarity, but readers of skill in the art will recognize that many variations of LRU-type replacement policies may be useful in memory management in accordance with embodiments of the present invention.

An attempt to access a cache line may result in a hit in a cache or a miss in a cache. If a cache line is hit in a cache, the cache line is accessed in the cache and the LRU information for the cache is updated to reflect the access. If a cache line is missed in a cache, an attempt to access the cache line in a lower level cache is made. A cache line, existing in both a higher and lower level cache, that is repeatedly accessed in the higher level cache, then, may rarely, if ever, be accessed in a lower level cache. In prior art, LRU information in the lower cache describing a cache line that is repeatedly accessed in the upper level cache may indicate that the cache line is one of the least recently used cache lines in the lower level cache, increasing the probability of eviction from the lower level cache. In memory hierarchies in which memory is managed in accordance with embodiments of the present invention, when a cache line, existing in both a higher and lower level cache, is evicted from the lower level cache in accordance with the LRU-type replacement policy, the cache line is also evicted from the higher level cache.

The method of FIG. 5 includes updating (514) LRU information (518) for the lower cache (506) to indicate that the line (510) has been recently accessed. LRU information is information indicating whether a cache line has been recently accessed. Such information may be implemented in a cache directory (512) as an attribute of the cache line, such as, for example, one or more 'age bits.' Updating (514) LRU information (518) for the lower cache (506) to indicate that the line (510) has been recently accessed has an effect of making the cache line appear recently used and retaining that line in the lower level of cache.

In the method of FIG. 5, identifying (516) a line preferably retained may be carried out in various ways. Identifying (516) a line preferably retained may, for example, be carried out by identifying (520) the line as preferably retained on every access in the first cache (504). Such identification may provide matching, or nearly matching, LRU-information for a cache line in a lower level and higher level cache. Such identification, however, may also require a large amount of computational overhead.

In the method of FIG. 5, identifying (516) a line preferably retained may also be carried out by identifying (522) the line as preferably retained when the line is accessed, not on every access, but only upon a randomly-selected subset of accesses. That is, each access may be assigned a particular probability, say 20 percent, of being an access upon which a line is identified as preferably retained. In this way, repeated access to particular lines in the first cache may increase the overall probability that the particular lines repeatedly accessed in the first cache will be retained in the lower cache. Also, identifying the line as preferably retained when the line is accessed on only upon a randomly-selected subset of accesses may require less computational overhead, than identifying a line upon every access of a line in the cache.

In the method of FIG. 5, identifying (516) a line preferably retained may also be carried out by identifying (524) the line as preferably retained when the line is accessed, not on every access, but only periodically according to a predetermined interval of time. That is, periodically, after a predetermined period of time, say 10 milliseconds, for example, lines existing in both a higher and lower cache are identified as lines preferably retained.

In the method of FIG. 5, identifying (516) a line preferably retained may also be carried out by identifying (526) the line as preferably retained when the line is accessed, not on every access, but only periodically according to a predetermined number of accesses. That is, whatever line is accessed on every predetermined number of accesses is a line preferably retained. Consider, for example, that the predetermined number of accesses is five. With such a predetermined number of accesses, the cache line accessed on every fifth access is identified as a cache line preferably retained.

The method of FIG. 5 may be implemented on a network on chip ('NOC'), as described above, that includes IP blocks, routers, memory communications controllers, and network interface controller, where each IP block is adapted to a router through a memory communications controller and a network interface controller with each memory communications controller controlling communication between an IP block and memory, and with each network interface controller controlling inter-IP block communications through routers.

Exemplary embodiments of the present invention are described largely in the context of a fully functional computer system for memory management among levels of cache in a memory hierarchy. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of memory management among levels of cache in a memory hierarchy in a computer with a processor operatively coupled through two or more levels of cache to a main random access memory, caches closer to the processor in the hierarchy characterized as higher in the hierarchy, the method comprising:
   identifying a line in a first cache that is preferably retained in the first cache upon an access of the line in the first cache, the first cache backed up by at least one cache lower in the memory hierarchy, the lower cache implementing a least recently used type ('LRU-type') cache line replacement policy; and
   updating LRU information for the lower cache to indicate that the line has been recently accessed
   wherein the method is implemented on a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, wherein each router implements a plurality of virtual communications channels, the virtual communications channels characterized by different communication types.

2. The method of claim 1 wherein identifying a line preferably retained further comprises identifying the line as preferably retained on every access in the cache.

3. The method of claim 1 wherein identifying a line preferably retained further comprises:
   identifying the line as preferably retained when the line is accessed, not on every access, but only upon a randomly-selected subset of accesses.

4. The method of claim 1 wherein identifying line further comprises:
   identifying the line as preferably retained when the line is accessed, not on every access, but only periodically according to a predetermined interval of time.

5. The method of claim 1 wherein identifying line further comprises:
   identifying the line as preferably retained when the line is accessed, not on every access, but only periodically according to a predetermined number of accesses.

6. An apparatus for memory management among levels of cache in a memory hierarchy in a computer with a processor operatively coupled through two or more levels of cache to a main random access memory, caches closer to the processor in the hierarchy characterized as higher in the hierarchy, the apparatus comprising a computer processor, a computer memory operatively coupled to the computer processor, the computer memory having disposed within it computer program instructions capable of:
   identifying a line in a first cache that is preferably retained in the first cache upon an access of the line in the first cache, the first cache backed up by at least one cache lower in the memory hierarchy, the lower cache implementing a least recently used type ('LRU-type') cache line replacement policy; and
   updating LRU information for the lower cache to indicate that the line has been recently accessed,
   wherein the apparatus further comprises a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, wherein each router implements a plurality of virtual communications channels, the virtual communications channels characterized by different communication types.

7. The apparatus of claim 6 wherein identifying a line preferably retained further comprises identifying the line as preferably retained on every access in the cache.

8. The apparatus of claim 6 wherein identifying a line in a first cache that is preferably retained in the first cache further comprises:
   identifying the line as preferably retained when the line is accessed, not on every access, but only upon a randomly-selected subset of accesses.

9. The apparatus of claim 6 wherein identifying a line in a first cache that is preferably retained in the first cache further comprises:
   identifying the line as preferably retained when the line is accessed, not on every access, but only periodically according to a predetermined interval of time.

10. The apparatus of claim 6 wherein identifying a line in a first cache that is preferably retained in the first cache further comprises:
    identifying the line as preferably retained when the line is accessed, not on every access, but only periodically according to a predetermined number of accesses.

11. A computer program product for memory management among levels of cache in a memory hierarchy in a computer with a processor operatively coupled through two or more levels of cache to a main random access memory, caches closer to the processor in the hierarchy characterized as higher in the hierarchy, the computer program product disposed in a computer readable, non-transitory medium, the computer program product comprising computer program instructions capable of:

identifying a line in a first cache that is preferably retained in the first cache upon an access of the line in the first cache, the first cache backed up by at least one cache lower in the memory hierarchy, the lower cache implementing a least recently used type ('LRU-type') cache line replacement policy; and updating LRU information for the lower cache to indicate that the line has been recently accessed, wherein the computer program instructions are executed on a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, wherein each router implements a plurality of virtual communications channels, the virtual communications channels characterized by different communication types.

12. The computer program product of claim 11 wherein identifying a line preferably retained further comprises identifying the line as preferably retained on every access in the cache.

13. The computer program product of claim 11 wherein identifying a line preferably retained further comprises:

identifying the line as preferably retained when the line is accessed, not on every access, but only upon a randomly-selected subset of accesses.

14. The computer program product of claim 11 wherein identifying line further comprises:

identifying the line as preferably retained when the line is accessed, not on every access, but only periodically according to a predetermined interval of time.

15. The computer program product of claim 11 wherein identifying line further comprises:

identifying the line as preferably retained when the line is accessed, not on every access, but only periodically according to a predetermined number of accesses.

* * * * *